UNITED STATES PATENT OFFICE.

MANLEY HOWE AND HENRY R. STEVENS, OF BOSTON, MASSACHUSETTS.

IMPROVEMENT IN THE MANUFACTURE OF DYE-COLORS.

Specification forming part of Letters Patent No. 40,263, dated October 13, 1863; Reissue No. 1,958, dated May 16, 1865.

*To all whom it may concern:*

Be it known that we, MANLEY HOWE and HENRY R. STEVENS, both of Boston, in the county of Suffolk, Commonwealth of Massachusetts, have invented certain new and useful Improvements in the Preparation or Manufacture of Dye-Colors, (for which Letters Patent were granted to us by the United States of America, bearing date on the 13th day of October, A. D. 1863;) and the specification thereto annexed, through inadvertence and mistake, not being an exact, full, and precise description and specification of the invention which we claim as our own, and for which we desired the said Letters Patent should be issued; and there being reason to believe that said Letters Patent are inoperative and invalid by reason that the terms and conditions prescribed by the Acts of Congress in such case made and provided have not, by such inadvertence and mistake, been complied with; now, therefore, we, the said MANLEY HOWE and HENRY R. STEVENS, in conformity with the statutes in that behalf provided, have surrendered the said Letters Patent; and we do now hereby declare that the following contains a full and correct description of the invention which we claim as our own, set forth and specified in those full and exact terms in which it should have been in the description and specification upon which said Letters Patents were issued.

Dyes as heretofore prepared could only be used by dyers, or those acquainted with the art of dyeing stuffs.

The object of our invention is to produce dye-colors which may be used by those uninitiated in that art, and thus to afford to families or individuals facility economically to dye faded or soiled or new articles of wear, whether the same be made of silk, wool, cotton, or other vegetable or animal fiber.

Our invention, therefore, consists in the production of dye-colors and their various shades in powder, with which are incorporated and intimately mixed the requisite quantity and quality of mordant to fix the colors upon the fibers and textiles of different derivations, as hereinafter set forth.

To enable others to make and use our invention, we shall now proceed more particularly to describe our invention, and the manner in which the same is or may be carried into effect.

We take the dye-colors of the trade—such as are prepared or manufactured for sale, to be used in dyeing establishments—or we take the material from which the dye-colors are extracted, and prepare the coloring therefrom in the usual way. These dyes may be of vegetable or mineral origin, or may be compounds of both or either. The colors are in all cases to be dried, pulverized, and thoroughly mixed or incorporated to produce a homogeneous mass. In cases when the colors to be extracted are derived from dye-woods, the wood should be first reduced to powder. For various colors and their shades powders of different woods or extracts are mixed in varying proportions, as is well known to those acquainted with the art of mixing and applying colors. The nature, properties, and uses of the various mordants are also well known; and, as this part of our invention or discovery does not consist of any new combination of color-ingredients to produce a given color, but is applicable to all such compositions of powdered coloring-matter, it is not necessary to describe here any of the ingredients or proportions which may be used to form the various colors and shades of color, as these are well known to dyers and those acquainted with the art of mixing and applying colors. With these powders we combine the mordant in the manner following: If the dye-color admits of a mineral mordant—such as alum—or a metallic salt—such as sulphate of iron, copper, &c.—then the process simply consists in grinding the mordant to a fine powder, and in mixing, distributing, and intimately incorporating the same with the powdered coloring-matter before described. The compound is now ready to be put in packages for sale and use.

When extracts are used for the coloring-matter—such as extract of logwood, extract of bark or quercitron, cutch or gambia, annoto, &c.—we dry the extract on evaporating tables or pans or by exposure to the sun and air until the moisture is expelled. We then reduce it to powder by the pestle or by grinding it in a suitable mill. We then thoroughly mix it with the requisite coloring-matter and mordants, as above described.

When sulphate of indigo is used as one of the coloring-matters in the composition, we mix the necessary mordants and coloring-matters together. This mixture is of a pasty consistency. To this we add starch or other like absorbent, thoroughly mixed and incorporated with it, of sufficient quantity to render the mass pulverulent by exposure to heat or dry air. The sulphate of indigo may be completely dried on the evaporating table or pans and then reduced to powder in the same way described for drying and powdering other extracts; but we prefer the former method, as by the latter process a certain amount of the acid is expelled and the coloring property of the indigo in some degree impaired. When the powdered indigo is used, as it has an affinity for moisture, it is well to add starch, to keep it thoroughly dry, in all cases where the other ingredients have not sufficient absorbent properties for that purpose.

If the dye-color requires a mordant containing tin or other metal in solution, then the process consists in first dissolving the metal by means of a suitable acid, then mixing as thoroughly as possible the solution, in requisite proportions, (such as are well known to chemists, manufacturers of dyes, and dyers,) with the dye-powder obtained as above described. By this means the color is formed at once in the wood. This we find particularly adapted to the following colors, to wit: cherry, crimson, orange, pink, salmon, scarlet, yellow, and their various shades. The mixture is then subjected to the action of hot air or exposure to the sun until dry, when it becomes pulverulent and reduced to powder. This powder is then ready to be put into packages for sale and use.

The salts of tin may be used instead of the solution, in which case tartaric or some other dry acid in powder must be added, (in order to brighten the color,) and the whole thoroughly mixed; but we prefer to use the solution, as the color is thereby formed in the mixture. To prevent the deliquescence of the salts, starch may be added to the mixture.

When the coloring-matter used with the solution or the salts of tin consists of ground or powdered dye-woods, cochineal, or lac, the absorbent properties of the same render the use of starch or other additional absorbent unnecessary, and it becomes pulverulent by exposure to hot or dry air and ready to be put into packages; but as the muriate of tin has an affinity for moisture and readily absorbs it from the air, it is well in all cases where the packages are to be kept on hand for some time to add starch or other like absorbent, to keep the mixture thoroughly dry. This powder, prepared in either of the methods already described is then ready to be used or to be packed in packages for sale. The powder so prepared may be used in accordance with the following directions: Clean the goods thoroughly in strong soap-suds, so as to remove all dirt, spots, streaks, &c., rinse them in clean cold water, then put them in warm water until the dye is ready. Put the dye-powder into warm water, let it simmer one-half hour, stir often, skim, add water to cool, stir again. Then take the goods from the warm water and drop them into the dye, not in a bunch, but as openly as possible. Lift and stir goods constantly with a clean stick, that the dye may come to every part of the goods. For woolens, bring the dye-liquor up to a gentle boil. For silks, a simmering heat is sufficient. The boiler must not be directly over the fire while the goods are being dyed. Silks are dyed in from ten minutes to half an hour; woolens half an hour to two hours. Take out the goods, and hang them in the air about ten minutes. If you are dyeing black, brown, drab, or slate, rinse in warm soap-suds, and then rinse thoroughly in clean cold water. For all other colors rinse thoroughly in clean cold water only. Then dry them, and iron or press while damp, and they are ready to wear. Tin, crockery, or porcelain may be used for dyeing. Lift and stir the goods constantly when they are first put in the dye. Have plenty of water. The color in some goods discharges very easily. It is best to try a small piece before putting them into the dye, as the color would come out in the hot dye and change the color of the dye-liquor. Always use soft water (rain, pond, or river water, or such as is used for washing clothes) for these dyes, and have it perfectly clean. For dyeing less quantities of goods use less of the powders in the same proportions. Always use water enough to cover the goods. This process of using our dyes we do not claim, nor do we claim the process of mixing coloring-matter and mordant together in the bath.

It is well known, to dyers and those acquainted with the art of mixing and applying colors, that fabrics of different textiles require different compositions of coloring-matter and mordants to properly fix the colors upon them. For instance, one combination of coloring-matter and mordant will dye silk, but not equally woolen goods. Another combination of coloring-matter and mordants will fix the given color on woolen goods, but not upon silk or cotton; but to produce dye-colors in powder which will act either upon silk, woolen, or cotton fibers, as may be required, we combine coloring-matter and mordants in powder, so that the package shall contain the coloring-matter and mordant adapted to dye silk; also, the coloring-matter and mordant adapted to wool; also the coloring-matter and mordant adapted to cotton, &c., having present in the compositions both coloring-matter in kind and quantity and mordant or mordants in kind and quantity for which either of the different kinds of fabrics has an affinity, and from which it will receive and hold the color. It is not necessary to describe the different ingredients used in these compositions for the different kinds of colors, as they are various and well known to those acquainted with the art of mixing and applying colors.

Dyes prepared either for silk or wool will produce upon cotton a stain or partial dye.

It is well known to mixers of colors that there are drugs and dye-stuffs of an astringent nature which have a peculiar affinity for cotton, and drugs or dye-stuffs, which, when used with their appropriate mordants, will fix the desired color also upon cotton. The judgment of the mixer will readily suggest which he shall select to combine with other coloring-matter, taking care, when using astringent drugs to adapt the mixture to cotton as well as silk and woolen, to select such other coloring-matter for the combination as will not be affected or impaired by such astringents when the mixture is applied to silk or wool.

To produce dye-colors in powder which will fix the color upon fibers and textiles of different derivations, as far as may be, is one of the objects of our invention; and we find that the various kinds of drugs and dye-stuffs may be mixed in the manner before described to dye silk and wool of the various colors and shades, and silk, wool, and cotton, with the following-named colors, to wit: blue, green, brown, drab, slate, yellow, orange, cuir, maize, cherry, pink. The shades and colors produced by these may be varied by the length of time of the exposure in the bath, or may be deepened by repeating the process.

Having fully described our invention, we claim as follows:

1. As a new article of manufacture, dye-colors in powder, having incorporated with them the mordants in kind and quantity requisite, substantially as hereinbefore set forth.

2. There are certain dry dye-colors found in the market, such as cudbear, litmus, gambia, lac, ammoniacal cochineal, &c., which contain, to some extent, in combination with them, one or more of the substances by some classed among mordants; but the presence of these in the coloring-matter is due solely to the fact that they exist in the material from which the coloring-matter is produced, or some material used in making the same, and is developed in the process of manufacture. These articles and others of like nature are not used, however, as substantive dyes, but only as component parts of dye compositions; and these we do not claim. Nor do we claim dye-mixtures containing coloring-matter and mordants in a liquid or pasty state; nor powder-mixtures of coloring-matter and metallic or mineral salts known and used as ink-powders; nor do we claim mixtures of dyeing materials with mordants in powder, when the mixture is insufficient of itself to produce a dye that is a fixed and permanent color upon the fabric; but we claim a composition of coloring-matter in powder, with the requisite kind and quantity of mordant in powder, the whole thoroughly mixed together, as hereinbefore set forth.

3. Coloring-matter in powder mixed with metallic solution dried off and reduced to powder, as hereinbefore set forth.

4. Coloring-matter in powder containing the requisite kind and quantity of mordant, the whole reduced from a pasty state to powder, as hereinbefore set forth, each constituting a direct and substantive dye, and a new article of manufacture.

5. The above-described compositions of coloring-matters and mordants, adapted to dye silk, woolen, or cotton, or fabrics composed of any or all the said materials.

MANLEY HOWE.
HENRY R. STEVENS.

Witnesses:
GEO. W. TETTES,
G. S. CARPENTER.